United States Patent [19]

Wise

[11] Patent Number: 5,541,586
[45] Date of Patent: Jul. 30, 1996

[54] VISUAL OUTLET IDENTIFICATION IN A CABLE MANAGEMENT SYSTEM

[75] Inventor: James H. Wise, Palmyra, Pa.

[73] Assignee: The Whitaker Corporation, Wilmington, Del.

[21] Appl. No.: 362,287

[22] Filed: Dec. 22, 1994

Related U.S. Application Data

[63] Continuation-in-part of Ser. No. 321,494, Oct. 12, 1994, which is a continuation-in-part of Ser. No. 58,190, May 3, 1993.

[51] Int. Cl.$^6$ ........................................................ H04Q 1/18
[52] U.S. Cl. .............................. 340/825.79; 340/825.8; 340/825.17; 340/825.49
[58] Field of Search .................. 340/825.79, 825.8, 340/825.17, 825.49, 825.06; 379/327, 271, 291; 361/733, 737, 778, 781, 790, 791, 805; 370/53, 60; 455/3.1

[56] References Cited

U.S. PATENT DOCUMENTS

| | | |
|---|---|---|
| 3,175,127 | 3/1965 | Knox-Seith . |
| 3,978,291 | 8/1976 | Bergeron, Jr. . |
| 4,227,094 | 10/1980 | Semur et al. ............................ 307/113 |
| 4,472,765 | 9/1984 | Hughes ................................... 361/413 |
| 4,703,394 | 10/1987 | Petit et al. .............................. 361/413 |
| 4,756,695 | 7/1988 | Lane et al. .................................. 439/76 |
| 4,818,241 | 4/1989 | Smoot ........................................ 439/65 |
| 4,833,708 | 5/1989 | Goodrich ................................. 379/327 |
| 4,838,798 | 6/1989 | Evans et al. ............................... 439/61 |
| 4,876,630 | 10/1989 | Dara ........................................ 361/413 |
| 4,887,079 | 12/1989 | Hwang ................................... 340/825.8 |
| 4,887,260 | 12/1989 | Carden et al. ............................ 370/60 |
| 4,901,004 | 2/1990 | King .......................................... 324/66 |
| 4,949,171 | 8/1990 | Grandmougin ........................... 358/93 |
| 4,970,466 | 11/1990 | Bolles et al. ............................ 324/533 |
| 5,051,741 | 9/1991 | Wesby . |
| 5,062,151 | 10/1991 | Shipley ................................... 359/154 |
| 5,062,801 | 11/1991 | Roos ........................................ 439/61 |
| 5,122,691 | 6/1992 | Balakrishnan .......................... 307/475 |
| 5,190,460 | 3/1993 | Emani ...................................... 439/51 |
| 5,270,919 | 12/1993 | Blake et al. ............................. 364/401 |
| 5,289,340 | 2/1994 | Yoshifuji ................................. 361/695 |
| 5,296,850 | 3/1994 | King . |

FOREIGN PATENT DOCUMENTS

| | | |
|---|---|---|
| 0572117 | 12/1993 | European Pat. Off. . |
| 2620890 | 3/1989 | France . |
| 2635426 | 2/1990 | France . |
| 2695279 | 3/1994 | France . |

OTHER PUBLICATIONS

IBM Technical Disclosure Bulletin "Double Board Arrangement"; vol. 13, No. 6; Nov. 1970; 2 Pages.

*Primary Examiner*—Kenneth A. Wieder
*Assistant Examiner*—Edwin C. Holloway, III

[57] ABSTRACT

A cable management system which provides routing of wired services between service lines (16) and user lines (18). Each service line enters the cable management system at a service termination unit circuit card (22) which also holds a portion of a crosspoint switch matrix (126). Each user line enters the system at a line termination unit circuit card (20). The service termination unit circuit cards are all mounted to connectors (36) on a first side of a centerplane board (24) and the line termination unit circuit cards are mounted to connectors (36) on the other side of the centerplane board. Pins (37) extending through the centerplane board interconnect the connectors so that any service line can be connected to any user line. A system controller card (26) mounted to the centerplane board communicates with the circuit cards via a bus (38) on the centerplane board. An operator controlled management station (14) provides commands to the controller to control the operation of the cable management system. Each user line includes a subset of the wires of a multi-wire cable (162) extending from a line termination unit circuit card to a remote outlet (200). At the outlet, there is provided a visible indicator (230). A selector (232) is coupled to the indicator and to wires of the multi-wire cable which do not form a part of the user line. The selector responds to commands from the management station for energizing the indicator.

5 Claims, 11 Drawing Sheets

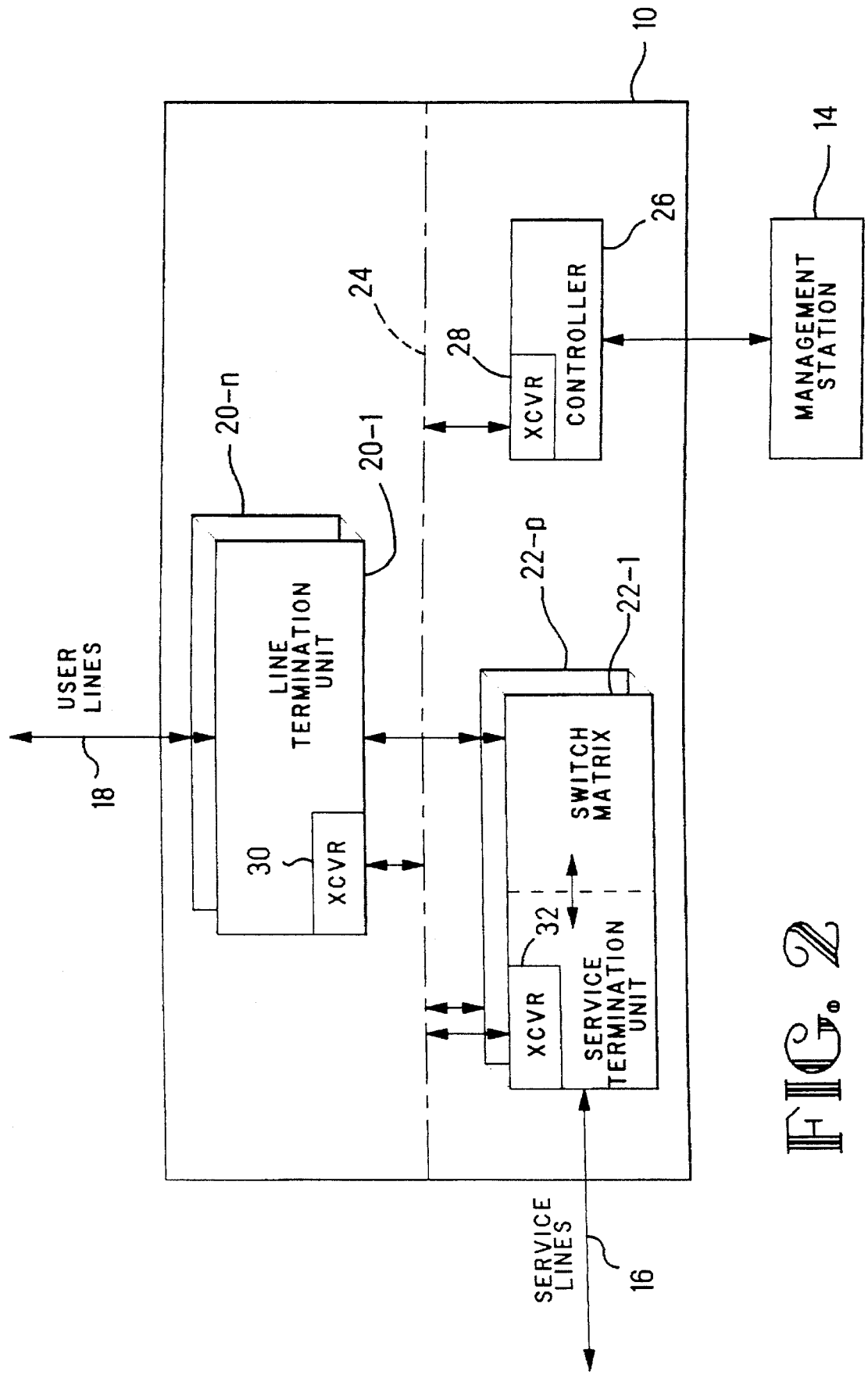

VISUAL OUTLET IDENTIFICATION IN A CABLE MANAGEMENT SYSTEM

BACKGROUND OF THE INVENTION

This is a continuation-in-part of prior co-pending application Ser. No. 08/321,494, filed Oct. 12, 1994, which is a continuation-in-part of prior co-pending application Ser. No. 08/058,190, filed May 3, 1993.

This invention relates to a cable management system which provides routing of telephony, low and high speed data, power and video, between service lines and user lines under computer control and, more particularly, to such a system wherein a specific outlet terminating a line can be visually identified.

When wiring a commercial building, it is conventional that all of the services carried by wire, such as telephony, low and high speed data, power and video, enter the building for termination at respective patch panels. The patch panels are typically located within wiring closets and include a first array of terminations for the service lines which enter the building and a second array of terminations for the user lines which extend within the building to various user stations. Within each patch panel, the connections between the service lines and the user lines are made manually via jumper wires extending between the first array of terminations and the second array of terminations. In an ideal situation, records would be maintained as to where each wire goes within the building and to what it is connected. However, since the real world is not ideal, such records are not always properly maintained. In addition, wires are often tagged at the patch panels and the tags are lost or become outdated because of lack of updating. Therefore, when a technician is given a service order to add, move or change a connection, the technician must first determine exactly which physical wires are involved. This has proven to be a very time consuming and labor intensive chore. It has been proposed to provide a cable management system with automatic record keeping capability.

The proposed cable management system is interposed between a plurality of service lines and a plurality of user lines and includes a plurality of line termination units mounted on circuit cards which provide connections to the user lines and a plurality of service termination units which are mounted on circuit cards and provide connections to the service lines. Controllable switching means are coupled between the terminations to the user lines and the service lines for selectively providing physical electrical connections between selected ones of the service lines and selected ones of the user lines. A controller is provided to control the switching means to selectively make and open connections between the service lines and the user lines in accordance with received commands, the controller having a memory in which is stored a map of the connections made through the switching means. An operator controlled management station is provided for issuing commands to the controller, the commands including a connect command to make a physical electrical connection through the switching means between a specified service line and a specified user line, and a disconnect command to open a physical electrical connection through the switching means between one or more specified service lines and one or more specified user lines.

In this cable management system, there is a centerplane board which has a first plurality of card edge connectors on a first side arranged in a first parallel array and a second plurality of card edge connectors on the other side arranged in a second parallel array orthogonal to the first parallel array. The first and second pluralities of card edge connectors are electrically interconnected through the centerplane board. The switching means are mounted on the circuit cards associated with the service termination units and these cards are installed in the card edge connectors on the first side of the centerplane board. The line termination unit circuit cards are installed in the card edge connectors on the other side of the centerplane board. Accordingly, any one or more of the plurality of service lines can be connected to any one or more of the plurality of user lines through the switching means. The controller is mounted on a circuit card installed in one of the card edge connectors on the first side of the centerplane board. A plurality of conductive bus lines are disposed on the centerplane board and are electrically interconnected to all the card edge connectors on both sides of the centerplane board. A respective transceiver coupled to the bus lines is provided on each of the circuit cards for the controller, the service termination units and the line termination units, for effecting communications therebetween over the bus lines.

Standard practice when wiring a commercial building for communications utilizes insulated cable which typically includes eight wires (e.g., four sets of unshielded twisted pair). Each multi-wire cable is run from a respective line termination unit circuit card above ceilings, below floors and behind walls, to its termination at an outlet, usually wall mounted, by means of which an appropriate peripheral user device can be coupled to the user line in the cable. With present day technology, at most four of the eight wires in the cable are used for communication. The remaining four wires are redundant, or, alternatively, may be used for some other purpose. The outlet connector to which the peripheral user device is connected is of standardized modular design, having eight contact positions. However, different types of peripheral user devices are connected to different combinations of four of the eight contact positions of the outlet connector. The proposed cable management system therefore includes an arrangement whereby the connections of the cable wires to the outlet connector contact positions can be selectively controlled to accommodate different types of peripheral user devices.

To keep the size of the switching means on the service termination unit circuit cards as small as possible, only the four wires of the eight wire cable that are used for communication should be switched. Therefore, the proposed cable management system also includes an arrangement whereby only those wires of the multi-wire cable which are used for communication are coupled to the switching means.

When a problem develops on a user line, a service technician is often dispatched to make a test connection at the outlet to which that user line is terminated. However, there are many situations where the room containing that outlet has a multiplicity of outlets and there are many situations where the outlet is part of a multi-outlet panel. When faced with such a situation, the technician may have difficulty determining which specific outlet is the one of interest. It is therefore an object of the present invention to provide an arrangement for visually identifying a particular outlet.

SUMMARY OF THE INVENTION

The foregoing and additional objects of the present invention are attained in accordance with the principles of this invention in a cable management system interposed between a plurality of service lines and a plurality of user lines and including a plurality of service termination unit circuit cards each connectable to a first predetermined number of respective ones of the plurality of service lines, a plurality of line termination unit circuit cards each connectable to a second predetermined number of respective ones of the plurality of user lines, and connecting means for connecting each of the plurality of service termination unit circuit cards to all of the plurality of line termination unit circuit cards. Each of the line termination unit circuit cards includes a respective port connector for each of the user lines connected to that line termination unit circuit card and a respective user line circuit path between each of the port connectors and the connecting means and each of the plurality of service termination unit circuit cards includes switching means for selectively connecting one of the plurality of service lines connected to that service termination unit circuit card to one of the plurality of user line circuit paths. An operator controlled management station controls the cable management system by issuing commands to effect the selective operation of the switching means. Each of the user lines consists of M wires within a cable having M+N wires, where M and N are integers, and each of the port connectors is connected to the M+N wires of the cable carrying the respective user line associated with that port connector. Each of the user line cables is terminated at a respective outlet for connection thereat to a peripheral user device, and the respective outlet includes a connector having at least M contact positions coupled to the respective user line cable. According to this invention, there is provided an arrangement for distinguishing a particular outlet from the other outlets. The inventive arrangement comprises a visual indicator associated with the particular outlet and exposed to view, and energizing means within the particular outlet and coupled to at least one of the N wires of the respective user line cable and to the indicator. The energizing means is responsive to a predetermined control signal received over the at least one of the N wires for energizing the indicator and the management station is adapted to provide the predetermined control signal to the particular outlet.

In accordance with an aspect of this invention, the indicator is a light emitting diode.

BRIEF DESCRIPTION OF THE DRAWINGS

The foregoing will be more readily apparent upon reading the following description in conjunction with the drawings in which like elements in different figures thereof are identified by the same reference numeral and wherein:

FIG. 2 is a block diagram of the cable management system of FIG. 1;

FIG. 3F is an enlarged detail of a portion of the first side of the centerplane board showing card connector identification code conductive areas and part of the communications bus;

DETAILED DESCRIPTION

Figure 1:
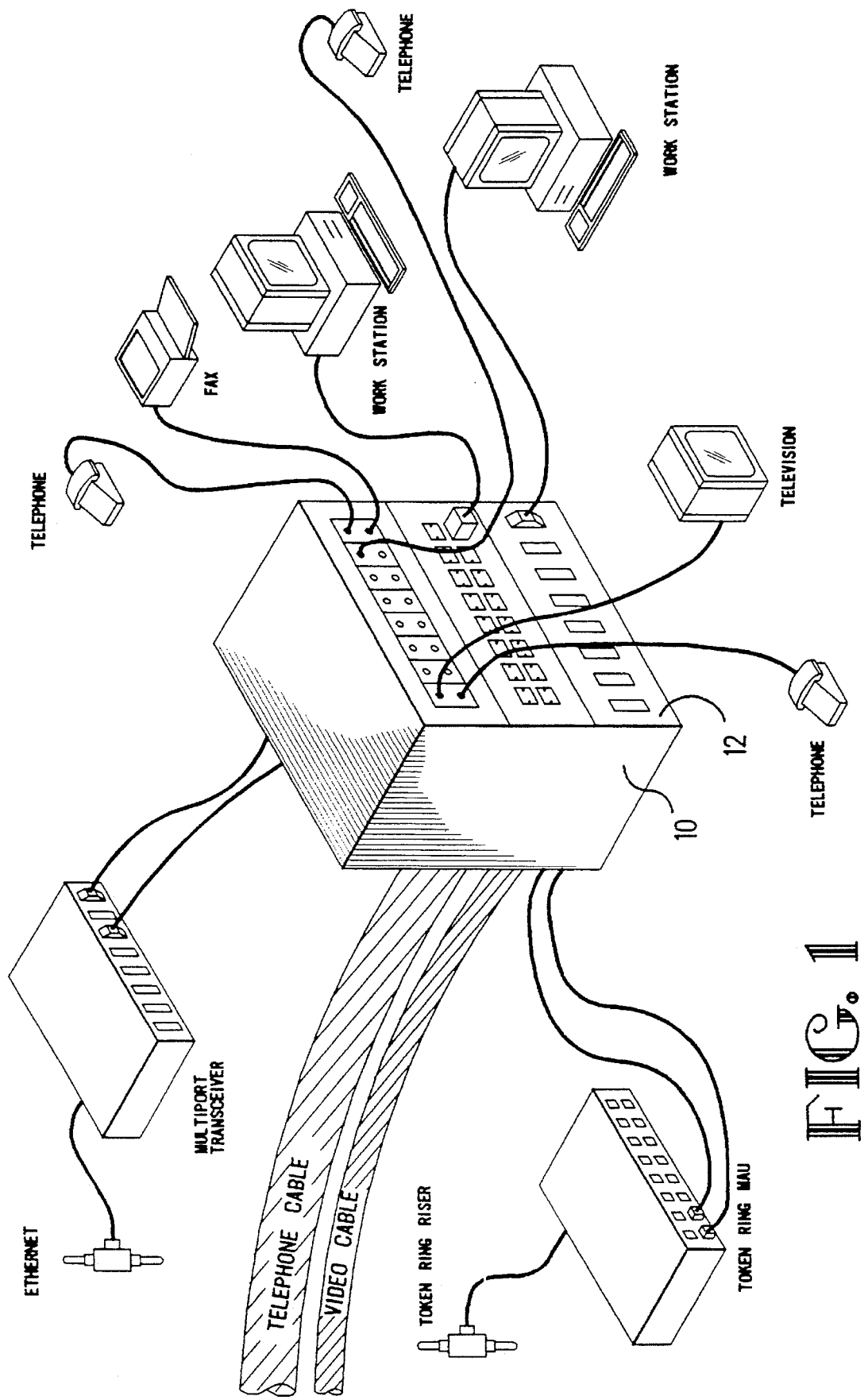
FIG. 1 is a conceptual drawing showing the proposed cable management system discussed above.

As shown in FIG. 1, the cable management system with which the present invention is concerned is contained within an enclosure 10 illustrated as having media-specific connectors on both its front surface 12 and its rear surface (not shown). The cable management system within the enclosure 10 serves as a flexible electronic patching, or cross-connecting, hub for automated cable management of communications circuits. Various services, such as LAN'S, telephone, computer I/O channels and peripherals, and video distribution links are connected to the cable management system through media-specific connectors on the rear surface of the enclosure 10. Typically, these will be aggregated multi-pair cables or high bandwidth cables, such as coax and fiber, common in riser and horizontal distribution subsystems. As shown in FIG. 1, such services include ethernet, telephone, video and token ring.

Matrix switch modules are installed within the enclosure 10. Media-specific connectors corresponding to the media selected for each user's work station subsystem wiring are installed on the front surface 12 and have cables which are attached and then run to the user's location. Thus, as shown in FIG. 1, at the user's location there may be one or more peripheral user devices, such as telephones, computer work stations, facsimile machines, or television sets. Once wired in this fashion, each user can be electronically connected to any combination of services that is required. All future changes in each user's service complement can be accomplished electronically.

The cable management system within the enclosure 10 maintains a data base of the location, source and destination for each cable. The system can be configured by a management station 14 (FIG. 2). As shown in FIG. 2, the cable management system contained within the enclosure 10 is connected to the service lines 16, which may be telephone lines, video lines, etc., which come to the system from the various service providers. The cable management system is also connected to the user lines 18 which extend to various user locations. The user lines 18 are each connected to a respective port on one of a plurality of line termination unit circuit cards 20-1, ..., 20-n. Similarly, the service lines 16 are each connected to a respective port on one of a plurality of service termination unit circuit cards 22-1, ..., 22-p.

The switching matrix for connecting the service lines 16 to the user lines 18 is distributed among the service termination unit circuit cards 22-1, ..., 22-p so that each of the service termination unit circuit cards 22-1, . . . , 22-p includes thereon a plurality of service termination units for connection to a group of the service lines 16 and a portion of the overall switch matrix. The line termination unit circuit cards 20-1, . . . , 20-n and the service termination unit circuit cards 22-1, . . . , 22-p are installed on opposite sides of a centerplane board 24, represented schematically in FIG. 2 by a dot-dash line, in such a manner that every line termination unit circuit card 20-1, . . . , 20-n is connected to the switch matrix portion of every service termination unit circuit card 22-1, . . . , 22-p, as will be described in full detail hereinafter.

Within the enclosure 10, there is also provided a controller circuit card 26 which is mounted to the centerplane board 24 on the same side thereof as the service termination unit circuit cards 22-1, . . . , 22-p. The controller circuit card 26 is connected to the management station 14 in a suitable manner, such as through an RS-232 link or a modem. To effect communications between the controller circuit card 26, the line termination unit circuit cards 20-1, . . . , 20-n, and the service termination unit circuit cards 22-1, . . . , 22-p, a multi-line communications bus 38 (FIG. 3C) is provided on the centerplane board 24. Each of the controller circuit card 26, the line termination unit circuit cards 20-1, . . . , 20-n, and the service termination unit circuit cards 22-1, . . . , 22-p, is provided with a respective transceiver 28, 30 and 32 which is coupled to the communications bus 38 when the respective circuit card is mounted to the centerplane board 24.

Each of the service termination unit circuit cards 22-1, . . . , 22-p includes a memory which contains a map of all the connections through the switch matrix portion on the respective service termination unit circuit card, and the controller circuit card 26 includes a memory which contains a map of all of the connections in the entire cable management system within the enclosure 10. The management station 14 issues commands to the circuitry on the controller circuit card 26. These commands include a connect command to make a connection between one or more specified service lines 16 and one or more specified user lines 18, and a disconnect command to open a connection between a specified one of the service lines 16 and a specified one of the user lines 18. The circuitry on the controller circuit card 26 places each appropriate command onto the communications bus 38 on the centerplane board 24, from which it is received by the transceiver 32 on the specified one of the service termination unit circuit cards 22-1, . . . , 22-p, which then controls its respective switch matrix portion in accordance with the received command to either make or open the specified connection.

Figure 3A:
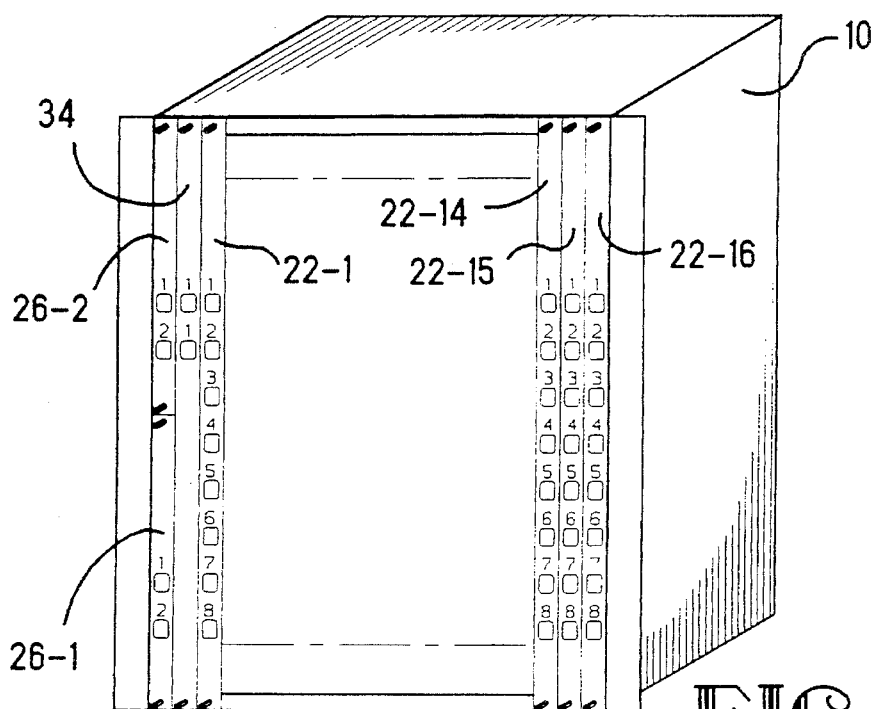
FIG. 3A schematically depicts the rear of the interior of the cable management system enclosure showing the service termination unit circuit cards and the controller cards.
Figure 3B:
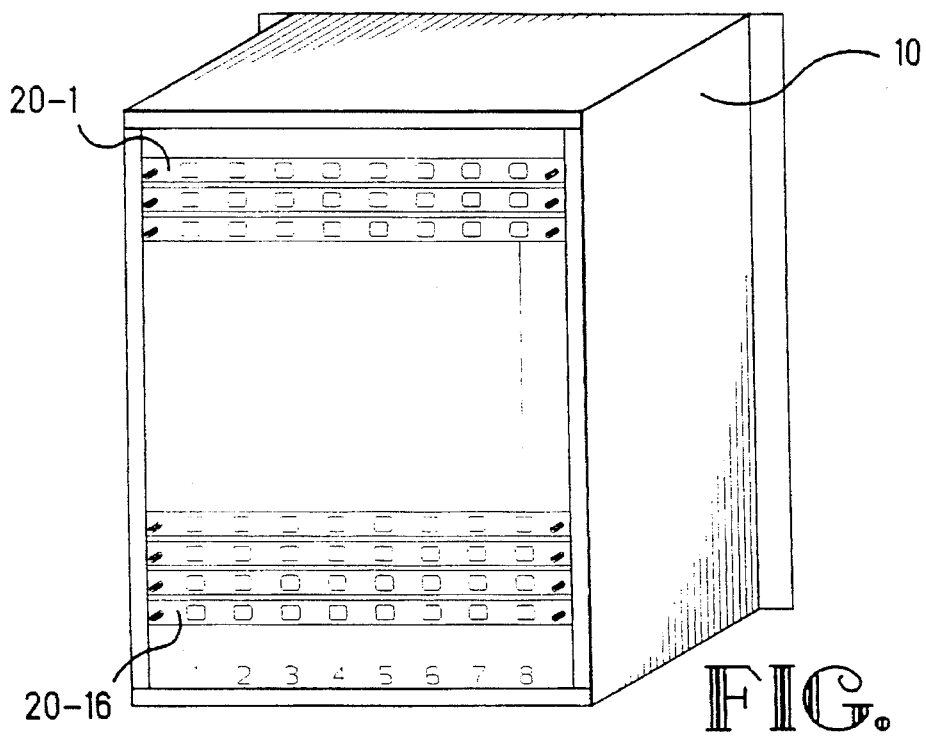
FIG. 3B schematically depicts the front of the interior of the cable management system enclosure showing the line termination unit circuit cards.

As shown in FIG. 3A, there are illustratively sixteen service termination unit circuit cards 22-1, . . . , 22-16 which are installed vertically in the enclosure 10 from the rear thereof. In addition, the controller circuit card 26, which is comprised of two half-cards 26-1 and 26-2, are also installed vertically, as is an additional controller circuit card 34, which plays no part in the present invention. As shown in FIG. 3B, there are illustratively sixteen line termination unit circuit cards 20-1, . . . , 20-16 which are installed horizontally in the enclosure 10 from the front thereof. Each of the line termination unit cards 20-1, . . . , 20-16 and the service termination unit circuit cards 22-1, . . . , 22-16 has eight ports terminated by a respective media-specific connector on the visible edge of the circuit card.

Figure 3C:
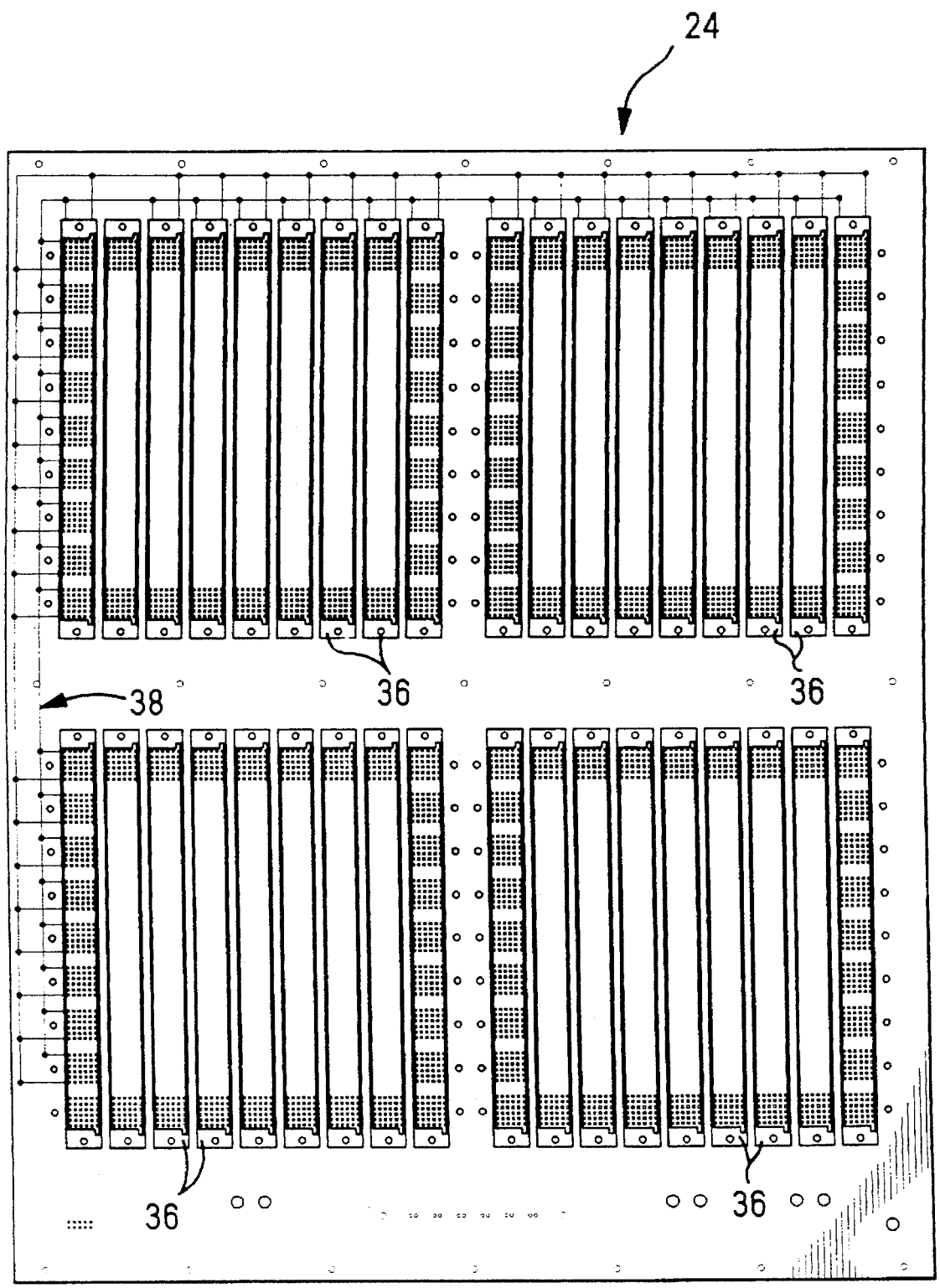
FIG. 3C shows a first side of the centerplane board, which side is adapted to mount the service termination unit circuit cards and the controller cards.
Figure 3D:
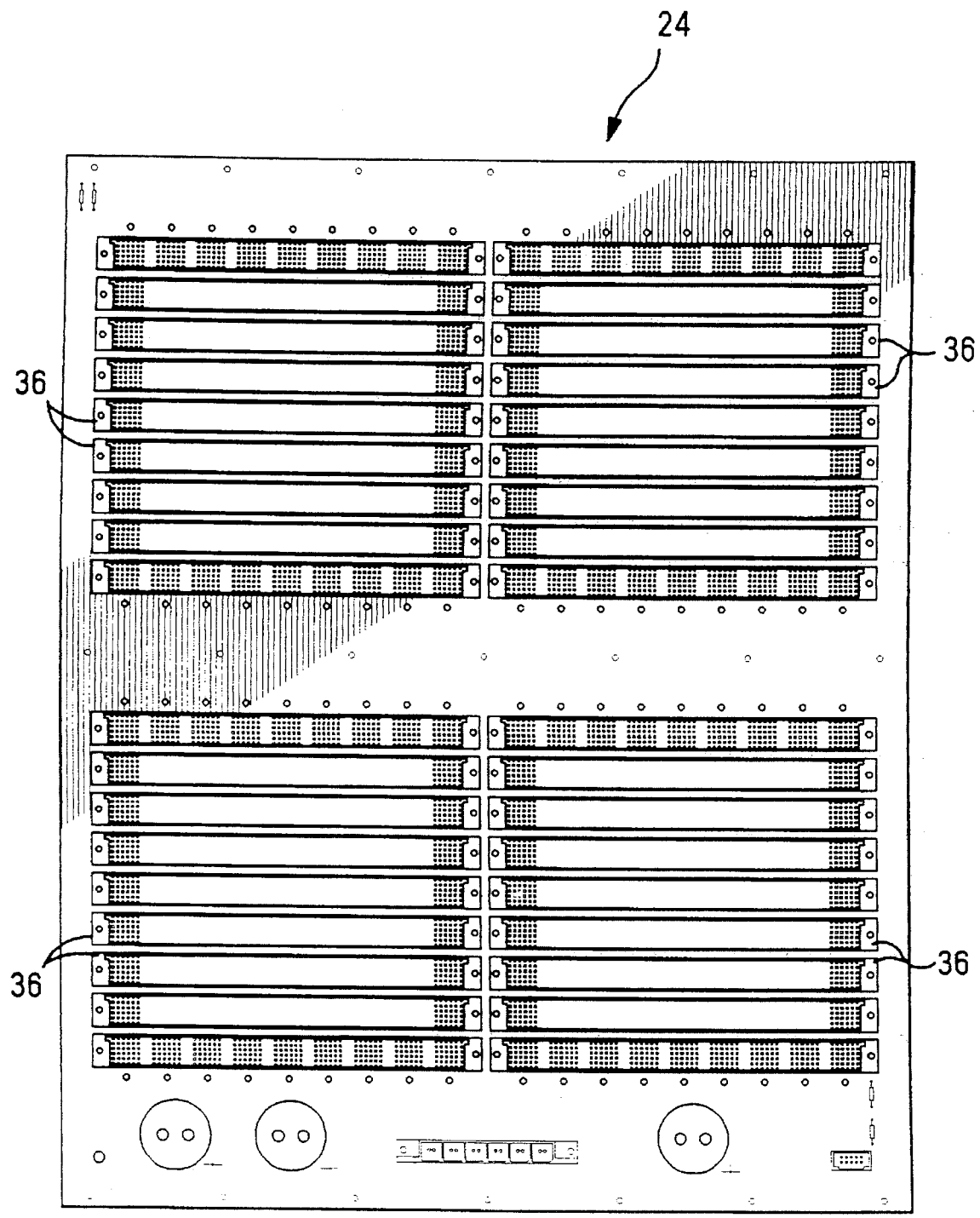
FIG. 3D shows the other side of the centerplane board, which side is adapted to mount the line termination unit circuit cards.

FIGS. 3C and 3D illustrate opposite sides of the centerplane board 24. Specifically, FIG. 3C shows the side of the centerplane board 24 on which the service termination unit circuit cards and the controller circuit cards are mounted and FIG. 3D shows the side of the centerplane board 24 on which the line termination unit circuit cards are mounted. Thus, as shown in FIG. 3C, for each of the service termination unit circuit cards and the controller circuit cards there is provided a pair of vertically oriented card edge connectors 36. Likewise, as shown in FIG. 3D, on the other side of the centerplane board 24 there is provided for each of the line termination unit circuit cards a pair of horizontally oriented card edge connectors 36. (The top and bottom rows of connectors 36 are not utilized.) Each of the card edge connectors 36 has within it nine fields, each of which includes thirty six pins 37 (FIG. 3E) arranged in a 6×6 square matrix. The pins 37 extend through the centerplane board 24 to a corresponding field in one of the card edge connectors 36 on the other side of the board 24, thereby interconnecting the connectors 36 on both sides of the board 24.

Illustratively, each of the service termination unit circuit cards 22-1, . . . , 22-16 and the line termination unit circuit cards 20-1, . . . , 20-16 has eight input/output ports. Each of these ports is a four wire port and each of the four wires of each port of the line termination unit circuit cards is connected to each of sixteen of the pin fields in the pair of connectors 36 to which its card is connected. This accounts for 8×4 =32 of the thirty six pins of each field. The remaining four pins in each of those sixteen pin fields are reserved for power, ground and control signals. Similarly, each of the four wires of a service termination unit circuit card port is connected to the switch matrix portion on that service termination unit circuit card. The outputs of each service termination unit circuit card's switch matrix portion are eight 4-wire bundles which are each connected to four pins of each of sixteen of the pin fields of the connector 36 associated with that service termination unit circuit card. Again, that accounts for thirty two of the thirty six pins in each of those sixteen pin fields, with the remaining four pins being reserved for power, ground and control signals.

Figure 3E:
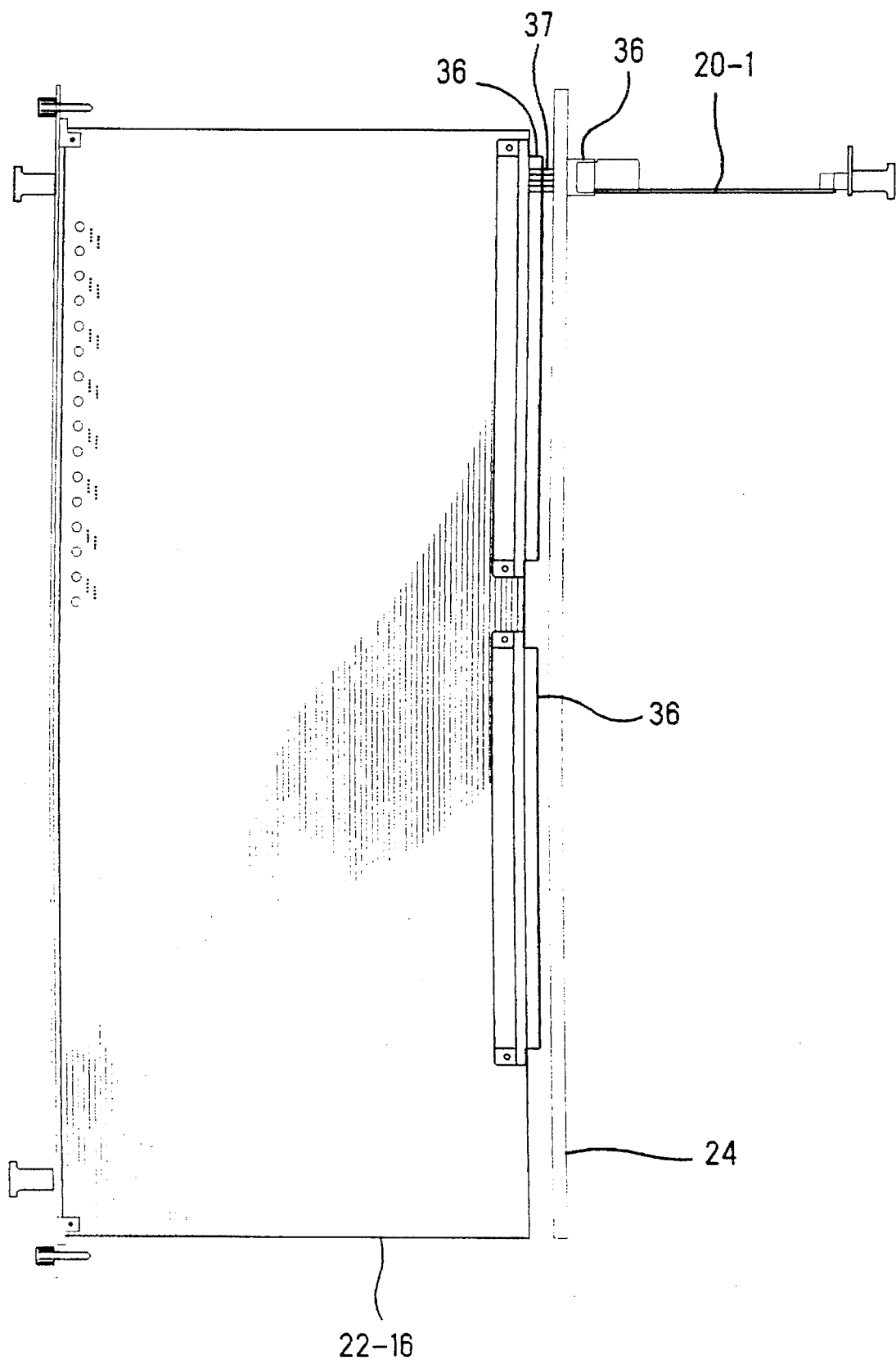
FIG. 3E schematically illustrates orthogonal edge connections of a service termination unit circuit card and a line termination unit circuit card to the centerplane board.
Figure 3B:
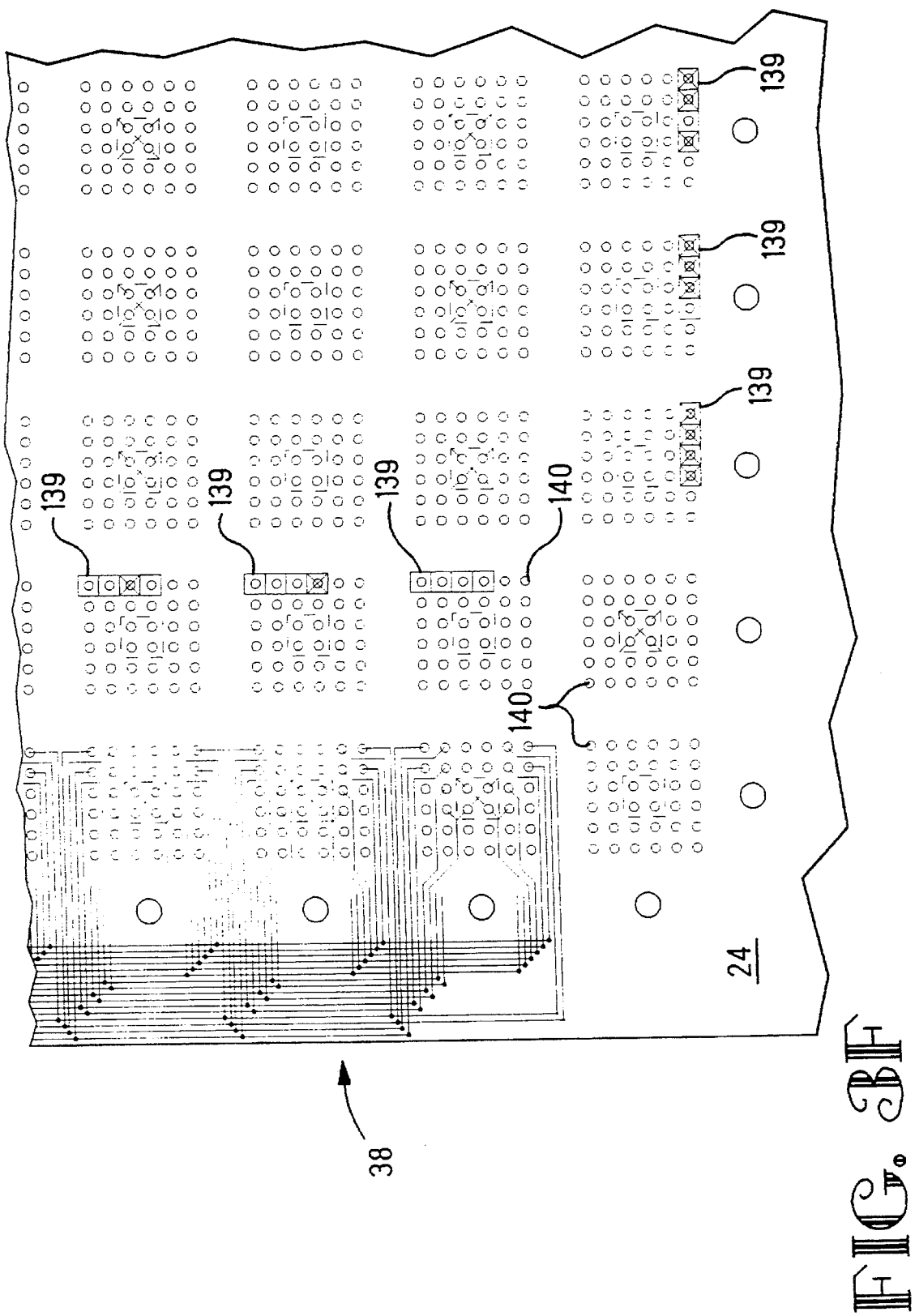

Because of the orthogonal relationship of the connectors 36 on both sides of the centerplane board 24, every port of a line termination unit circuit card is connected to a pin field connected to every one of the service termination unit circuit cards on the other side of the centerplane board 24. Thus, FIG. 3E illustrates how the line termination unit circuit card 20-1 is connected to a pin field of the service termination unit circuit card 22-16, as well as to all corresponding pin fields of all the other fifteen service termination unit circuit cards. As shown in FIG. 3E, the pins 37 (a 6×6 array) connect the card edge connectors 36 on the two sides of the centerplane board 24 at their intersection (i.e., at their common pin fields). Illustratively, the line termination unit circuit cards 20-1, . . . , 20-16 take up the second through the seventeenth rows of the horizontal connectors 36 on their side of the centerplane board 24. The top and bottom rows are vacant. Similarly, the service termination unit circuit cards 2-1, . . . , 22-16 take up the third through the eighteenth columns of the vertical connectors 36 on their side of the board 24. Thus, through the switch matrices on the service termination unit circuit cards, any one of the service lines 16 can be connected to any one of the user lines 18. In the illustrative embodiment, there are sixteen service termination unit circuit cards, each with eight ports, for a total of 128 service ports and there are sixteen line termination unit circuit cards, each having eight ports, for a total of 128 user ports. Each switch matrix portion on a service termination unit circuit card is an eight port by 128 port (32 by 512 lines) matrix of crosspoints. Thus, as disclosed, each of the 128 service lines can be connected to each of the 128 user ports.

As shown schematically in FIG. 3C, there is a multi-wire communications bus 38 on the centerplane board 24. The bus 38 extends parallel to the leftmost column of the vertical connectors 36 and parallel to the upper row of the horizontal connectors 36 (not shown in FIG. 3C) on the other side of the board 24. In order that the transceivers 28, 30 and 32 may be interconnected, the bus 38 is terminated at the pin fields in the second through seventeenth rows of the leftmost column for connection to the transceivers 30 on all of the line termination unit circuit cards 20-1, . . . , 20-16; at the upper pin fields in the third through eighteenth columns for connection to the transceivers 32 on all of the service termination unit circuit cards 22-1, . . . , 22-16; and at the upper pin field of the first column for connection to the transceiver 28 of the controller circuit card 26.

Figure 4:
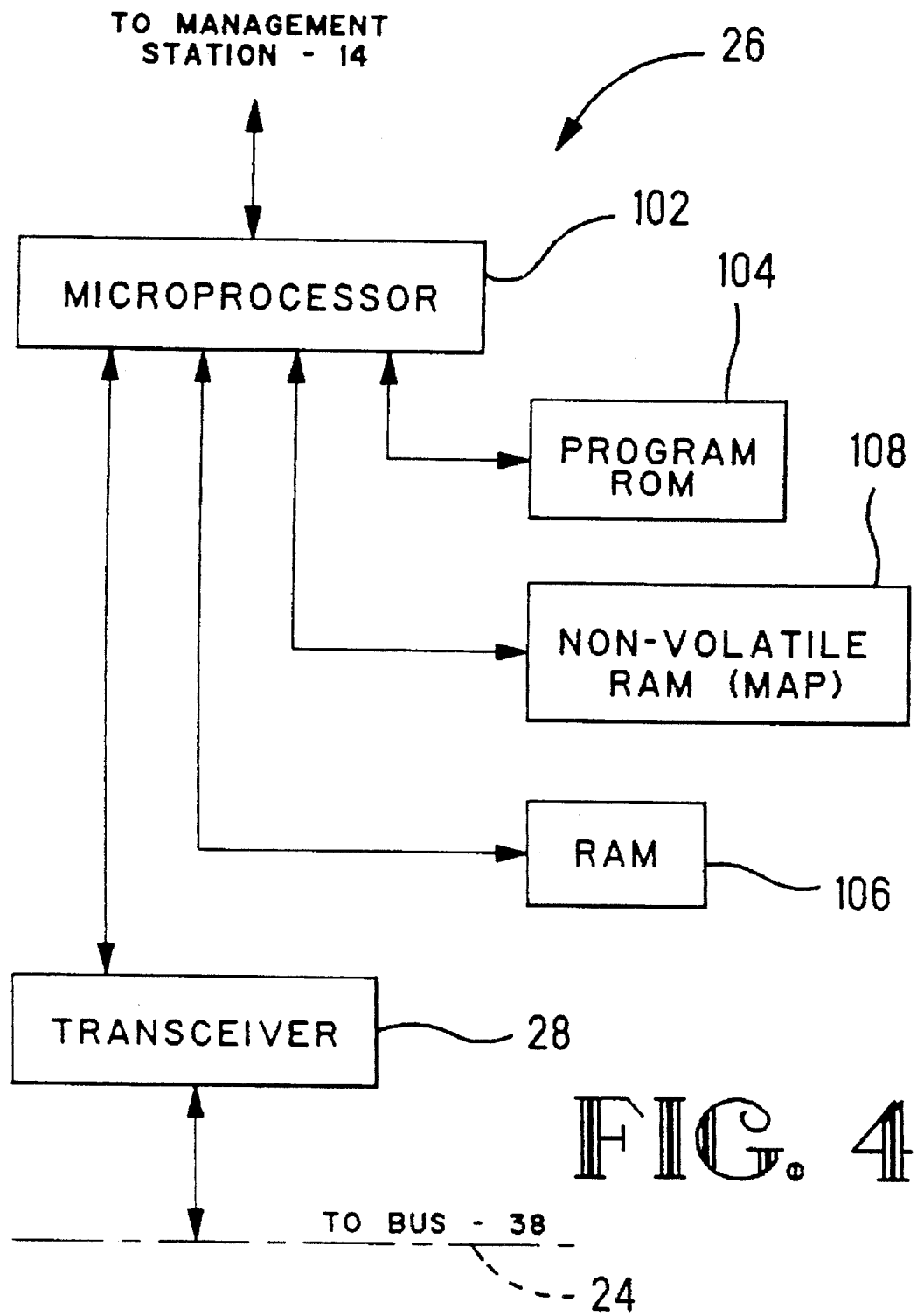
FIG. 4 is a block diagram of an illustrative controller for the cable management system of FIG. 2.

FIG. 4 illustrates circuitry on the controller circuit card 26 which may be utilized in the cable management system according to this invention. The controller 26 includes a microprocessor 102 which is associated with three different types of memory. The first type of memory is a program read only memory (ROM) 104 which has stored therein the program instructions for operating the microprocessor 102. The microprocessor 102 is also associated with a random access memory (RAM) 106 which is utilized as a temporary storage memory by the microprocessor 102. Lastly, there is a non-volatile random access memory 108 which is utilized to store a map showing all of the connections through the switch matrix portions on the service termination unit circuit cards 22-1, . . . , 22-p as well as information as to what type of card is installed in each of the connectors 36. The non-volatile RAM 108 may be an electrically erasable PROM or a "flash" PROM which saves its contents even when power is lost. Since it takes a relatively long time to write information into the non-volatile RAM 108, the RAM 106 is used to temporarily store the map until such time as it is written into the non-volatile RAM 108.

The microprocessor 102 is coupled to the management station 14 in any suitable manner, such as by an RS-232 link or a modem, or through a local area network. The microprocessor 102 receives commands from the management station 14, such as a connect command or a disconnect command as described above, and in accordance with the program stored in the ROM 104 transmits instructions over the bus lines 38 on the centerplane board 24 via the transceiver 28. Illustratively, the transceiver 28 is a Neuron® chip manufactured by Echelon Corp. The microprocessor 102 addresses a specified one of the service termination unit circuit cards 22-1, . . . , 22-p over the bus 38 via the transceiver 28 and provides an appropriate instruction for controlling the switch matrix portion of that service termination unit circuit card. The microprocessor 102 receives acknowledgements of its instructions, which are returned over the bus 38 from the specified service termination unit circuit card, via the transceiver 28, and updates the map stored in the non-volatile RAM 108.

Figure 5:
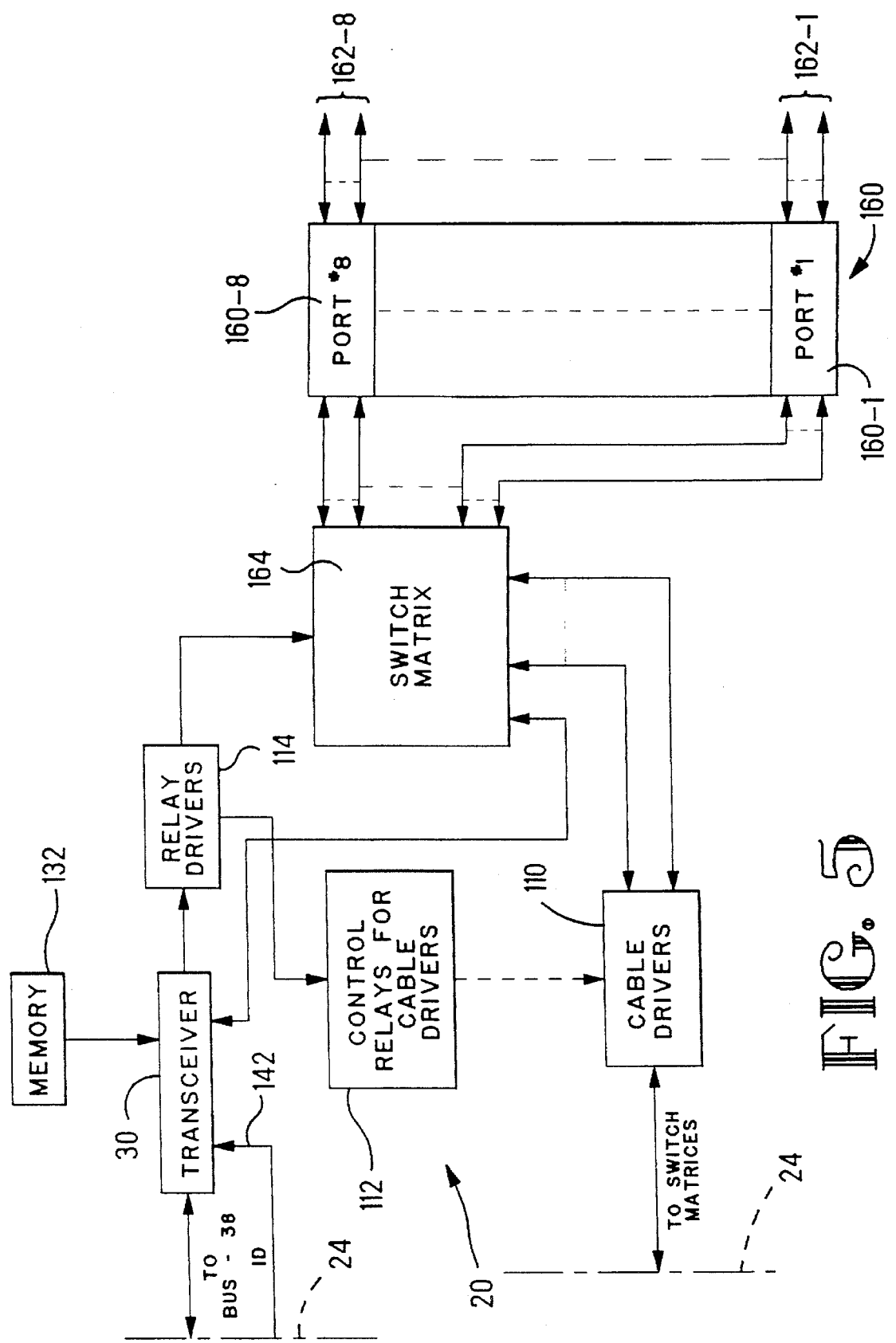
FIG. 5 is a block diagram showing the circuitry on an illustrative line termination unit circuit card for the cable management system of FIG. 2.

The line termination unit circuit card 20 illustrated in FIG. 5 includes the transceiver 30 coupled to the bus lines 38 on the centerplane board 24. Illustratively, the transceiver 30 is a Neuron® chip manufactured by Echelon Corp. The function of the line termination unit circuit card 20 is to provide interfaces between the user lines 18 and the switch matrices on the service termination unit circuit cards 22-1, . . . , 22-p mounted on the other side of the centerplane board 24. This interfacing takes place via user line circuit paths which include the cable drivers (amplifiers) 110. The cable drivers 110 are selectively controllable to pass signals either from individual ones of the service lines 16 to individual ones of the user lines 18 or in the reverse direction from individual ones of the user lines 18 to individual ones of the service lines 16, as determined by the settings of respective ones of the control relays 112. The control relays 112 are controlled by the relay drivers 114 which are operated on the basis of instructions received via the transceiver 30 from the microprocessor 102 of the controller 26 over the bus lines 38 on the centerplane board 24. Initially, all the cable drivers 110 are set to pass signals in the direction from the user lines 18 to the service lines 16, with the cable drivers being bypassed. This ms for safety reasons so that upon system start-up dangerously high amplified signals are not inadvertently transmitted to the user lines 18, where they could damage sensitive equipment.

Figure 6:
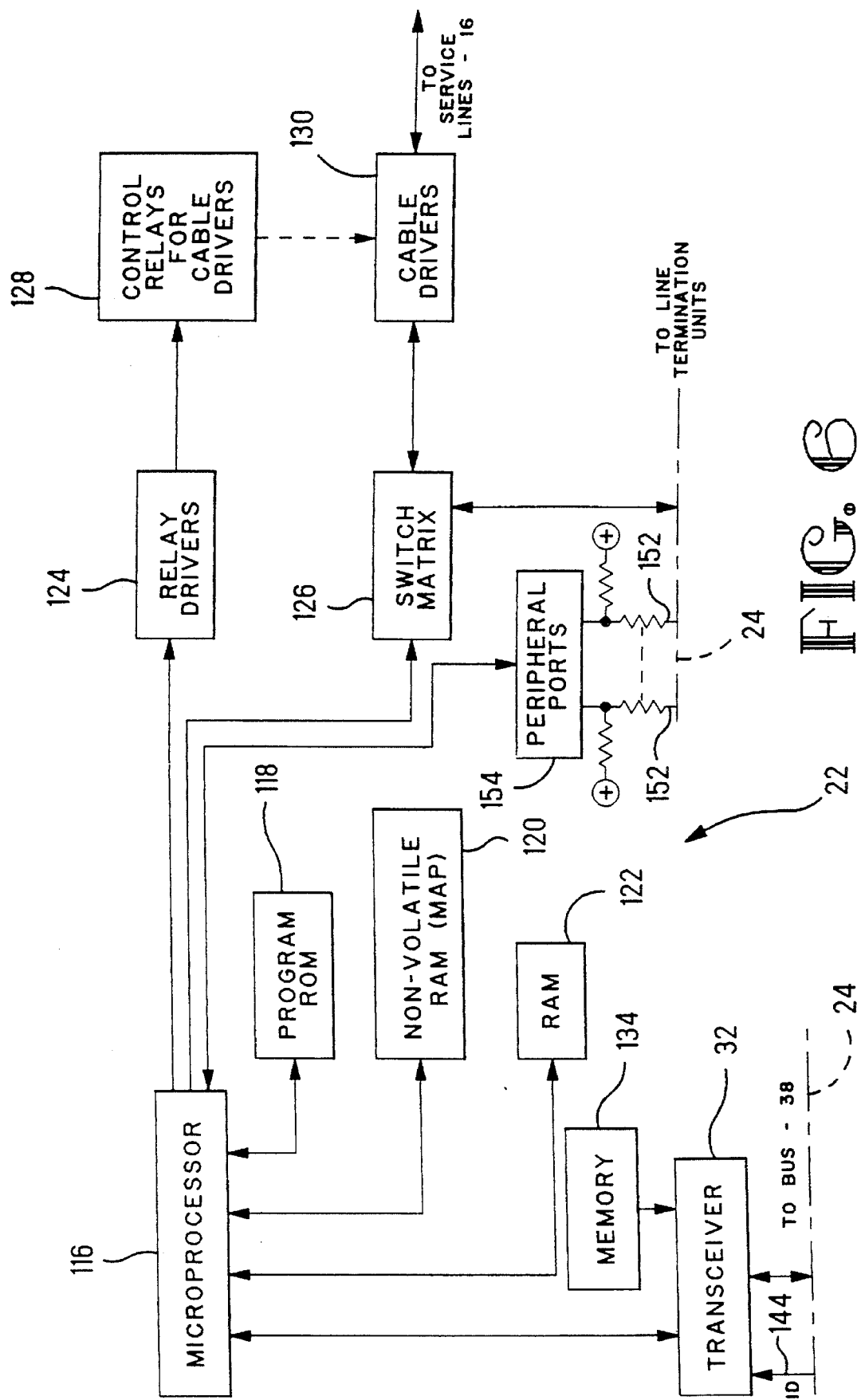
FIG. 6 is a block diagram showing the circuitry on an illustrative service termination unit circuit card for the cable management system of FIG. 2.

FIG. 6 illustrates the circuitry 22 on one of the service termination unit circuit cards 22-1, . . . , 22-p. This circuitry includes a microprocessor 116 having associated therewith three types of memory. There is a program ROM 118, a non-volatile RAM 120 and a RAM 122. These memories function similarly to the memories 104, 108 and 106, respectively, associated with the microprocessor 102 of the controller 26, but are specifically for the particular one of the service termination unit circuit cards 22-1, . . . , 22-p with which they are associated. The microprocessor 116 is coupled to the transceiver 32, which is illustratively a Neuron® chip manufactured by Echelon Corp. The transceiver 32 is coupled to the bus lines 38 on the centerplane board 24 and is utilized for communications between the microprocessor 116 and the microprocessor 102 on the controller circuit card 26. Instructions received by the microprocessor 116 via the transceiver 32 over the bus 38 from the microprocessor 102 are utilized to control the relay drivers 124 and the switch matrix 126. Interfacing between the service lines 16 and the switch matrix 126 is effected via service line circuit paths which include the cable drivers (amplifiers) 130. The relay drivers 124 set the control relays 128 so that the cable drivers 130 interposed between the service lines 16 and the switch matrix 126 are "pointing" in the proper directions. Again, as with the cable drivers 110 associated with the line termination unit circuit cards 20-1, . . . , 20-n, the cable drivers 130 are initially bypassed. The switch matrix 126 is connected to all of the line termination unit circuit cards 20-1, . . . , 20-n mounted on the other side of the centerplane board 24, as previously described, so that any one of the service lines 16 entering that particular service termination unit card may be connected to any one of the user lines 18. In accordance with instructions received from the microprocessor 102 on the controller circuit card 26, the microprocessor 116 controls the switch matrix 126 to make an appropriate physical electrical connection therethrough between a specified one of the service lines 16 entering that card and a specified one of the user lines 18 entering any one of the line termination unit circuit cards 20-1, . . . , 20-n on the other side of the centerplane board 24.

In order that the controller 26 can make appropriate connections between service termination unit circuit cards and line termination unit circuit cards, each of these circuit cards includes a respective memory chip, illustratively an EPROM, which contains unique "as built" information for that card. Such information includes the type of ports on that card, the configuration of the ports, etc. This memory is loaded at the time the circuit card is manufactured, or at least prior to the circuit card being installed in the cable management system. Thus, as shown in FIG. 5, each line termination unit circuit card 20 includes an "as built" memory 132 coupled to the transceiver 30 and, as shown in FIG. 6, each service termination unit circuit card 22 includes an "as built" memory 134 coupled to the transceiver 32. Further, in order that the controller 26 can identify the connector in which a particular one of the service termination unit circuit cards or the line termination unit circuit cards is mounted, an arrangement is provided wherein a unique identification code is assigned to each of the connectors on each side of the centerplane board 24. FIG. 3F illustrates how such identification code assignment is effected.

FIG. 3F illustrates, on an enlarged scale, a portion of the centerplane board 24. Preferably, the board 24 is a multi-layer printed circuit board with an array of 6×6 matrices of apertures 140 which correspond to the pin fields interconnecting the connectors 36 on the two sides of the board 24. A pattern of conductive material corresponding to the identification code for each of the connectors 36 is provided on the board 24 in a predetermined area associated with each of the connectors 36. Specifically, the pattern of conductive material extends into selected ones of the apertures 140 to contact the pin extending through that aperture. Preferably, the conductive areas 139 are all connected to a ground level trace on one of the layers of the board 24, so that a pattern of ground signals is applied to selected pins of each of the connectors 36, which pattern of ground signals is received by the particular service termination unit circuit card or line termination unit circuit card mounted to that connector. A binary code is utilized for the identification code. Since each side of the centerplane board 24 can hold up to sixteen service termination unit circuit cards or up to sixteen line termination unit circuit cards, the identification codes for each side of the board 24 are each comprised of four bits ($2^4=16$). As shown in FIG. 3F, since the service termination unit circuit cards are mounted vertically on one side of the board, the identification code illustratively is provided in the bottom pin field of each of the sixteen columns of pin fields in which a service termination unit circuit card may be installed. Thus, starting in the third column from the left, the four rightmost apertures of the bottom row of the bottom pin field are utilized for the identification codes. As shown, each of those four apertures either has a conductive area extending therein for contact with a respective pin (as indicated by an X-ed square surrounding that aperture) to ground that pin, or the conductive area does not extend into that aperture (as indicated by an open square surrounding that aperture) to allow that pin to electrically float. The grounding of a pin corresponds to a binary ZERO and the electrical floating of a pin corresponds to a binary ONE. Thus, the service termination unit circuit card mounted in the third column from the left (i.e., service termination unit circuit card number 1) has the binary identification code 0000; the service termination unit circuit card mounted in the fourth column from the left has the binary identification code 0001; the service termination unit circuit card mounted in the fifth column from the left has the binary identification code 0010; etc., it being noted that the most significant bit of each binary identification code is on the right, as viewed in FIG. 3F, but is on the left in the above text. Similarly, the identification codes for the horizontally mounted line termination unit circuit cards illustratively are provided in the second through seventeenth rows of the second column of pin fields. The binary coding scheme for the horizontal line termination unit circuit cards is the same as for the vertical service termination unit circuit cards.

The aforedescribed binary identification codes are permanently established and associated with specific ones of the connectors 36. Thus, the binary identification codes identify the physical locations of installed service termination unit circuit cards and line termination unit circuit cards so that if a service termination unit circuit card is moved from one of the connectors 36 to another of the connectors 36, its binary identification code will change. As shown in FIG. 5, for each of the line termination unit circuit cards 20, the binary identification code is provided over the leads 142 from the centerplane board 24 to the transceiver 30. Similarly, as shown in FIG. 6, for each of the service termination unit circuit cards 22, the binary identification code is provided over the leads 144 from the centerplane board 24 to the transceiver 32.

In addition to the binary identification codes and the "as built" information stored in the memories on the circuit cards, as discussed above, each of the Neuron® chips making up the transceivers 28, 30, 32 is provided, upon its manufacture, with a burned in random identification number. Upon the initial application of power to the system 10, and alternatively upon receiving a "map" command from the management station 14, the controller 26 polls all of the line termination unit circuit cards 20-1 . . . , 20-n and all of the service termination unit circuit cards 22-1, . . . 22-p over the bus 38. When polled, each of the line termination unit circuit cards and service termination unit circuit cards provides on the bus 38 its binary identification code received on the respective lines 142, 144, its "as built" information from its respective memory 132, 134, and the identification number of its Neuron® chip. In this way, the controller 26 can generate a "map" of all of the "assets" within the enclosure 10.

As previously mentioned, each of the user lines 18 typically comprises four wires of an eight wire cable extending from a line termination unit circuit card to a remote outlet, usually wall mounted. For effective communication over the cable, the subset of four wires making up the user line must be selected from among the eight wires of the cable and then must be properly terminated in the right order at both ends of the cable to the line termination unit circuit card and to the outlet connector. In the past, this has been accomplished by a technician making dedicated fixed connections at both ends of the cable. Thus, if one were to change the type of peripheral user device connected at the outlet, unless the new peripheral user device used the same combination of wires in the same order, a technician was required manually to effect a change of the connections. In the proposed cable management system, such changes can be effected under automatic control from the management station 14.

Figure 7:
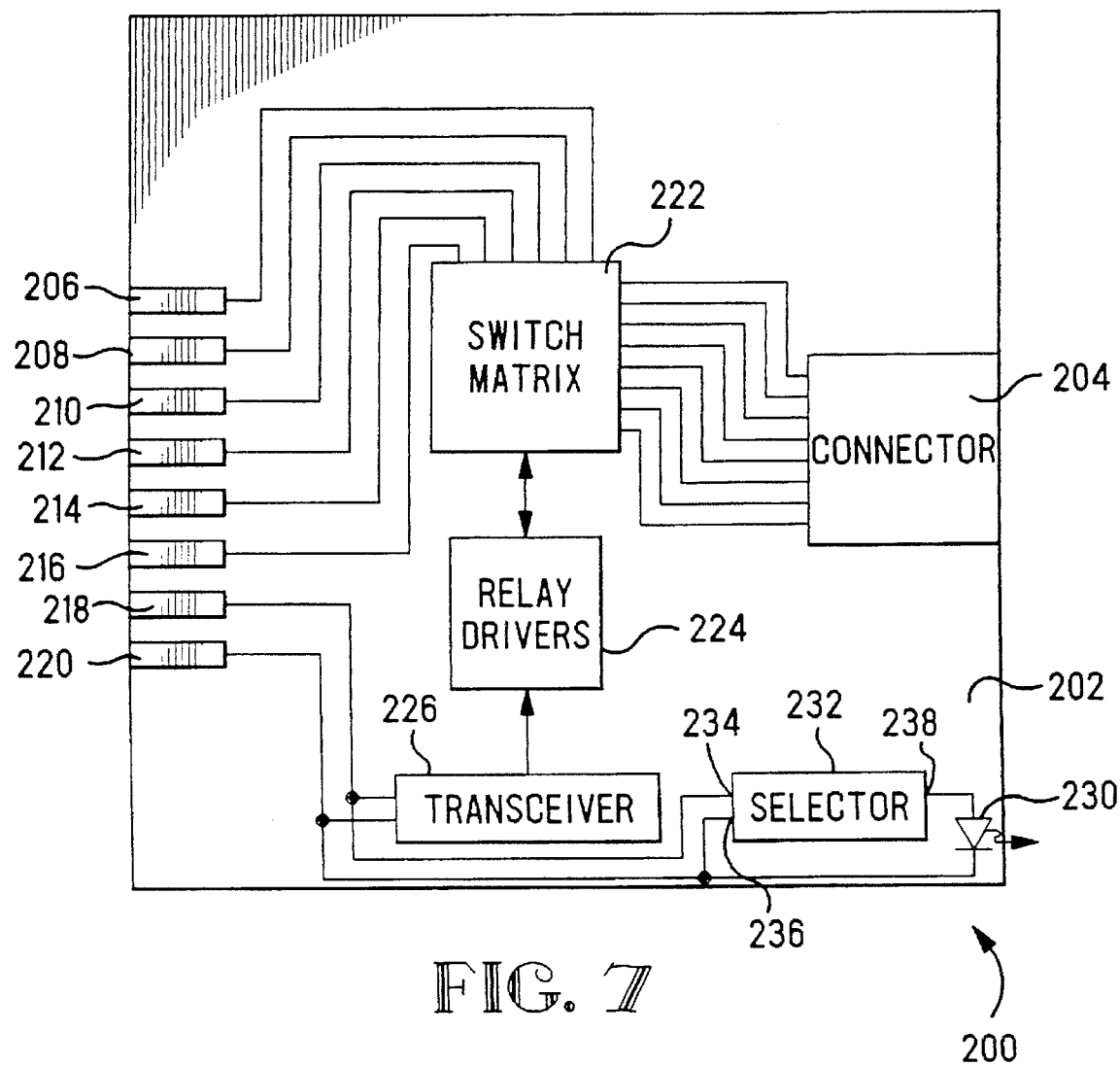
FIG. 7 schematically depicts an outlet including an arrangement according to this invention.

FIG. 7 illustrates an outlet, designated generally by the reference numeral 200, in which an arrangement is incorporated for effecting such selection and ordering of the cable wires. The outlet 200 is generally of the type known as an ACO (AMP Communications Outlet) manufactured by AMP, Incorporated of Harrisburg, Pa. Such an outlet is described in U.S. Pat. No. 4,756,695, with FIG. 11 thereof showing a preferred form having an eight contact modular jack. Thus, the outlet 200 includes a printed circuit board 202 to which is mounted a standardized eight contact modular jack, or connector, 204. At the other end of the board 202 are eight contact pads 206, 208, 210, 212, 214, 216, 218, 220, adapted to be engaged by a card edge connector (not shown) to which an eight wire cable is secured so that each of the wires of the cable is connectable to a respective one of the contact pads 206, . . . , 220. At this point, it is to be noted that the card edge connector and the board 202 are keyed so that the card edge connector can only be installed on the board 202 with a predetermined orientation to insure that the cable wires have a predetermined correspondence with the contact pads.

A switch matrix 222 is provided in the outlet 200. The matrix 222 is mounted on the circuit board 202 and is made up of a rectangular array of controllable crosspoint switches. As shown, the crosspoint switches are relay operated, controlled by the relay drivers 224. However, it is understood that semiconductor switches could also be utilized. In any event, one side of the matrix 222 has six lines, each connected to a respective one of the contact pads 206, 208, 210, 212, 214 and 216. The other two contact pads 218 and 220 are connected to the transceiver 226, as will be described hereinafter. The other side of the matrix 222 has eight lines, each connected to a respective one of the eight contact positions of the connector 204. Accordingly, each of the contact pads 206, ..., 216 is connectable through crosspoint switches of the matrix 222 to all of the contact positions of the connector 204.

The transceiver 226 is illustratively a Neuron® chip manufactured by Echelon Corp. and requires two wires for power and communication, it being understood that in some applications, three or more wires may be needed for power and communication. Therefore, the contact pads 218 and 220 are dedicated to the transceiver 226. Upon receipt of appropriate instructions, the transceiver 226 causes the relay drivers 224 to make appropriate connections through the switch matrix 222 so that four of the contact pads 206, ..., 216 are connected to four of the contact positions of the connector 204. As will be described, the transceiver 226 receives its instructions from the management station 14. Accordingly, a particular set of four contact positions of the connector 204 can be selected and ordered to define the user line connection to the peripheral user device.

As shown in FIG. 5, the multi-wire cables 162-1, ..., 162-8 which contain the user lines 18 enter each line termination unit circuit card 20 at a respective one of the port connectors 160-1, ..., 160-8. Each of the port connectors 160 has eight contact positions—one for each of the eight wires in the respective eight wire cable 162. The eight contact positions of each of the port connectors 160 are connected to one side of a 6×8 switching matrix within the switch matrix 164. Each of the 6×8 matrices is made up of a rectangular array of controllable crosspoint switches. As shown, the crosspoint switches are relay operated, controlled by the relay drivers 114. However, it is understood that semiconductor switches could also be utilized. In any event, four wires on each of the other side of each of the switch matrices is connected to a respective user line circuit path which includes the cable drivers 110. The other two wires connected to that side of each of the switching matrices is coupled to the transceiver 30 and is utilized for providing instructions from the management station 14 to the transceiver 226 at the outlet 200. It is to be noted that while the foregoing description has referred to the connector 204 as having as many contact positions as there are wires in the cable 162, there may be certain situations where the number of contact positions is different from the number of cable wires. However, the proposed cable management system is versatile and readily modifiable to adapt to such situations.

Thus, with the complete system disclosed above having switching matrices both at the outlet 200 and at the line termination unit circuit card 20, full selective control of the wires within each of the user line cables 162 may be effected. Thus, not only can the contact positions at the outlet connector 204 be ordered, but in addition redundancy control of the wires within each of the cables 162 can be effected. If redundancy control is not desired, then the switching matrix 164 on the line termination unit circuit card 20 may be eliminated and the cable drivers 110 would be connected directly to the port connectors 160. It is understood that at least two wires of each of the cables 162 must be reserved for communication to control the switch matrix 222 at the outlet 200.

Referring to FIG. 7, according to the present invention the outlet 200 includes a light emitting diode 230. The light emitting diode 230 is mounted to the printed circuit board 202 and is visible through an opening provided therefor in the housing of the outlet 200, preferably immediately adjacent the outlet connector 204. Also mounted to the circuit board 202 is a selector 232. The selector 232 is illustratively a type 2405 address switch integrated circuit chip manufactured by Dallas Semiconductor of Dallas, Tx.

The selector 232 includes a memory and a transceiver. Part of that memory is an unique identifier (i.e., a serial number) for that specific integrated circuit chip which is burned into the chip during its manufacture. The selector 232 has three terminals. The terminal 234 is the data/power terminal of the selector 232 and is connected to the contact pad 218. The terminal 236 is the ground terminal of the selector 232 and is connected to the contact pad 220. It is noted that the selector 232 is connected in parallel with the transceiver 226, but each is addressed individually, so there is no interference therebetween.

The terminal 238 is the input/output terminal of the selector 232 and is connected to the anode of the light emitting diode 230, the cathode of which is connected to the ground terminal 236 of the selector 232. The selector 232 responds to commands at its data/power terminal 234 having the unique serial number of that chip embedded therein for opening its input/output terminal 238 to allow power to be passed from the data/power terminal 234 to energize the light emitting diode 230. Thus, when a test is to be performed on a particular user line, the operator of the management station 14 causes an appropriate command to be transmitted to the controller 26, which in turn sends an appropriate command to the transceiver 30 on the line termination unit circuit card to which that user line is connected. The transceiver 30 then communicates to the selector 232 over the wires of the user line cable 162 connected to the contact pads 218, 220 to cause the light emitting diode 230 to be energized. Therefore, when the service technician arrives at the location having the outlet 200, the energized light emitting diode 230 provides a visual indication of the specific outlet which is connected to the user line to be tested.

Accordingly, there has been disclosed an improved cable management system wherein a specific outlet terminating a user line can be visually identified. While an illustrative embodiment of the present invention has been disclosed herein, it is understood that various modifications and adaptations to the disclosed embodiment will be apparent to those of ordinary skill in the art. Thus, while the disclosed embodiment is directed to an implementation of this invention for the user lines of a cable management system, the principles of this invention are also applicable to the service lines. Therefore, it is intended that this invention be limited only by the scope of the appended claims and equivalents thereto.

What is claimed is:

1. In a cable management system interposed between a plurality of service lines (16) and a plurality of user lines (18) and including a plurality of service termination unit circuit cards (22) each connectable to a first predetermined number of respective ones of said plurality of service lines, a plurality of line termination unit circuit cards (20) each connectable to a second predetermined number of respective ones of said plurality of user lines, connecting means (24, 36, 37) for connecting each of said plurality of service termination unit circuit cards to all of said plurality of line termination unit circuit cards, each of said line termination unit circuit cards including a respective port connector (160) for each of the user lines connected to that line termination unit circuit card and a respective user line circuit path (110) between each of said port connectors and said connecting means, each of said plurality of service termination unit circuit cards including switching means (126) for selectively connecting one of the plurality of service lines connected to that service termination unit circuit card to one of said plurality of user line circuit paths, operator controlled management station means (14) for controlling said cable management system by issuing commands to effect the selective operation of said switching means, each of said user lines consisting of M wires within a cable (162) having M+N wires, where M and N are integers, each of said port connectors being connected to said M+N wires of the cable carrying the respective user line associated with said each port connector, each of said user line cables being terminated at a respective outlet (200) for connection thereat to a peripheral user device, and said respective outlet including a connector (204) having at least M contact positions coupled to the respective user line cable, an arrangement for distinguishing a particular outlet from other outlets comprising:

a visual indicator (230) associated with said particular outlet, said indicator being exposed to view;

energizing means (232) within said particular outlet and coupled to at least one of said N wires of the respective user line cable and to said indicator, said energizing means being responsive to a predetermined control signal received over said at least one of said N wires for energizing said indicator;

and wherein said management station means is adapted to provide said predetermined control signal to said particular outlet.

2. The arrangement according to claim 1 wherein said indicator comprises a light emitting diode.

3. The arrangement according to claim 2 wherein said energizing means comprises transceiver means coupled to said at least one of said N user line cable wires and to said light emitting diode.

4. The arrangement according to claim 1 wherein:

said energizing means comprises a selector switch integrated circuit chip having a data/power terminal, a ground terminal and an input/output terminal, with said input/output terminal being selectively coupled to said data/power terminal through said chip;

said data/power terminal is coupled to a first of said N user line cable wires;

said ground terminal is coupled to a second of said N user line cable wires; and said indicator is a two-terminal device coupled to said input/output terminal and said ground terminal.

5. The arrangement according to claim 4 wherein said indicator comprises a light emitting diode.

* * * * *